United States Patent [19]

Kohashi et al.

[11] 4,030,813
[45] June 21, 1977

[54] CONTROL ELEMENT HAVING LIQUID LAYER ATTAINABLE TO GEOMETRICALLY UNEVEN STATE IN RESPONSE TO ELECTRICAL SIGNAL

[75] Inventors: Tadao Kohashi; Toshiharu Kurosawa, both of Kawasaki, Japan

[73] Assignee: Matsushita Electric Industrial Co., Ltd., Japan

[22] Filed: Dec. 17, 1975

[21] Appl. No.: 641,821

[30] Foreign Application Priority Data

Dec. 20, 1974  Japan .............................. 49-147460
Sept. 2, 1975  Japan .............................. 50-106731

[52] U.S. Cl. ............................ 350/161 S; 350/267
[51] Int. Cl.² ..................................... G05D 25/00
[58] Field of Search ........... 350/160 R, 161 S, 267; 204/299

[56] References Cited

UNITED STATES PATENTS

| 2,062,468 | 12/1936 | Matz | 350/161 S |
| 3,397,313 | 8/1968 | Mast | 350/161 S |
| 3,909,116 | 9/1975 | Kohashi | 350/160 R |

Primary Examiner—William L. Sikes
Attorney, Agent, or Firm—Robert E. Burns; Emmanuel J. Lobato; Bruce L. Adams

[57] ABSTRACT

A device comprising a support member of a solid material, a liquid material in intimate contact with and supported by the support member and an electrical means for creating an electric field having an electric vector in a direction parallel to the interface between the two materials to cause an electroosmotic movement of a portion of the liquid material and a resulting patterned unevenness of the configuration of the liquid material, wherein the liquid material contains a derivative of silane or siloxane which has a functional group having chemical affinity with solid organic materials useful as the support member, typified by vinyl, methacryloxy, cycloepoxy, mercapto and chlorine radicals, and/or another functional group having chemical affinity with inorganic materials useful as the support member, typified by alkoxyl group. When the solid and liquid materials are transparent, the device functions as an electrically controllable optical lens.

41 Claims, 10 Drawing Figures

CONTROL ELEMENT HAVING LIQUID LAYER ATTAINABLE TO GEOMETRICALLY UNEVEN STATE IN RESPONSE TO ELECTRICAL SIGNAL

This invention relates to a device which is fundamentally composed of a support member of a solid material, a liquid material in intimate contact with and supported by the support member and an electrical means for producing a patterned potential difference in the liquid material to cause an electroosmotic movement of the liquid material relatively to the support member. The device is useful as a control element of which behavior to an electrical or optical signal is variable in response to the mode and/or the magnitude of the potential difference in the liquid material.

When a liquid material is kept in intimate contact with a solid material, an electric double layer is formed in the boundary regions of the two materials. It is possible to cause at least a portion of the liquid material to move relatively to the solid material along the interface between the two materials by creating an electric field of an appropriate polarity in the liquid material. The movement, which may be called an electroosmotic movement, of the liquid material results in a maldistribution such as local heaps and dents, for example, of the liquid material in the electric field. Then the liquid material on the solid material takes the form of an uneven or undulated layer and can serve as an optical lens when the liquid material is regarded as an optical medium. As a dielectric material, the undulated liquid layer may serve either as an electromagnetic lens or as a capacitor having a non-uniform capacitance per unit area. Since the magnitude of the movement of the liquid material along the interface between the solid material depends on the field strength of the electric field created in the liquid material, the optical or electrical property of the undulated layer of the liquid material can be varied, for example, by varying the magnitude of a voltage impressed on a pair of electrodes arranged in the liquid material. Accordingly, a device which can control the travel of either light rays or electromagnetic waves therethrough or store electric energy therein in a variable quantity can be obtained when a liquid material is supported by and kept in intimate contact with a solid material and the liquid material is combined with a certain electrical means for creating an electric field of an appropriate polarity in the liquid layer to have an electric vector in a direction parallel to the interface between the two materials.

A light modulating device on this principle has been disclosed in a prior patent application in U.S. Ser. No. 407,834 filed Oct. 19, 1973 (in Canada, Ser. No. 183,804 filed Oct. 19, 1973) by Kohashi, who is one of the inventors of the present invention.

A device of the prior application includes a light modulation element which causes refraction and scattering of incident light rays proportionately to the magnitude of the potential difference created in a liquid material layer thereof. The light modulation element utilizes an inorganic material such as quartz, borosilicate glass or soda lime glass as the light-transmittable solid material and an organic liquid material such as tricresyl phosphate or dimethyl silicone oil as the liquid material which makes an electroosmotic movement on a layer of the inorganic solid material. A light modulation element relying on such a liquid material, however, involves a problem that the element has rather a low sensitivity to a voltage applied thereto. When an electric field is created in a region of the liquid layer by impressing a D.C. voltage on a pair of electrodes disposed in the liquid layer at a distance of 500 $\mu$m from one another, for example, the magnitude of the voltage is usually needed to be on the order of $10^2$ V so that the field strength may reach a value of $10^{-1}$ to $10^0$ V/$\mu$m with respect to the gap between the electrodes. Besides, the magnitude or amplitude of a resulting undulation of the liquid layer remains still at an unsatisfactorily low level.

These problems are not specific to the use of an electroosmotically movable liquid layer as an optical lens. A device in which a similarly movable liquid material serves as a dielectric material confronts the same problems.

It is an object of the present invention to provide a control element which includes a liquid material capable of attaining to a geometrically uneven state in response to an electrical signal and a support member of a solid material to support the liquid material and has a distinctly higher sensitivity to a voltage applied thereto in regard to the geometrical change of the liquid material than a prior art control element of a similar construction.

It is another object of the invention to provide a light modulating device including a modulation element which comprises a layer of either an inorganic or an organic light-transmittable solid material and a thin layer of an organic light-transmittable liquid material coated on one side of the solid material layer and can cause refraction and scattering of light rays impinged on the liquid layer to great extents by an electroosmotic movement of the liquid material even when an electric field of a comparatively feeble strength is created in the liquid layer.

A device according to the present invention comprises the following elements: a support member of a solid material; a liquid material which is in intimate contact with and supported by the support member; and an electrical means for creating in the liquid material a patterned electric field which has an electric vector in a direction parallel to the interface between the support member and the liquid material, whereby a portion of the liquid material makes an electroosmotic movement in a direction parallel to the interface when the electric field is present in the liquid material. The liquid material contains at least one silicon compound which has a first functional group having a chemical affinity with an organic solid material useful as the material of the support member and/or a second functional group having a chemical affinity with an inorganic solid material useful as the material of the support member.

The silicon compound is preferably a derivative of silane or siloxane including organopolysiloxane. The first functional group is preferably vinyl group, methacryloxy group, cycloepoxy group, mercapto group or chlorine considering that synthetic resins are useful as organic materials for producing the support member. The second functional group is preferably an alkoxyl group such as methoxy, ethoxy or methoxyethoxy group considering that quartz or a silica-containing glass such as soda lime glass or borosilicate glass is preferable as an inorganic material of the supporting member.

When a control element according to the invention is intended to serve as an optical lens, the support member is made of a material pervious to visible light and takes the form of a horizontally arranged substrate plate, and the liquid material which also is pervious to light is coated on a surface of the substrate plate as a layer of a uniform thickness. The electrical means, which is at least a pair of electrodes of a transparent material placed on the aforementioned surface of the substrate in a spaced arrangement, for example, is arranged such that the electroosmotic movement of a portion of the liquid layer causes the thickness of the liquid layer to become uneven. A light modulating device is obtained by combining the thus constructed control element with an optical means for detecting bendings of visible light rays, which are irradiated on the liquid layer, caused by travel of the rays through the liquid layer when the electric field is present therein. Such an optical means is exemplified by a Schlieren system or, more preferably, a semitransparent sheet which is spaced from the liquid layer such that the light rays impinge on the semitransparent sheet after the rays passed through the liquid layer.

Other features and advantages of the invention will become apparent from the following detailed description of preferred embodiments with reference to the accompanying drawings, wherein.

Figure 1:
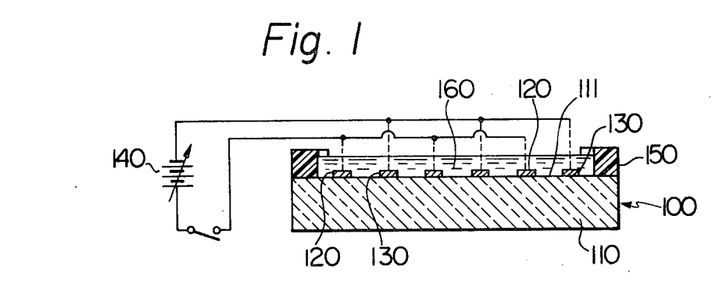
FIG. 1 is a cross-sectional view of a control element according to the invention which is useful for a light modulating device.

A control element 100 of FIG. 1 is intended for use in a light modulating device and is constructed fundamentally as disclosed in the prior application quoted hereinbefore. This element 100 has a flat plate 110 which is of a transparent solid material of usually a few mm in thickness as the substrate. This plate 110 is arranged in a horizontal plane. Both the upper and lower end faces of the plate 110 are preferably surface-finished to an extent of being optically smooth enough to avoid unintentional refraction and/or scattering of visible light rays upon transmission of the rays through the plate 110. The solid material of the plate 110 may be either an inorganic material exemplified by glass or an organic material exemplified by a cellulose ester as will be described hereinafter. A plurality of elongate electrodes 120 of the same polarity are attached onto the upper surface 111 of the plate 110 spaced from and in parallel relation with one another, and a plurality of similarly shaped electrodes 130 of the reverse polarity are attached onto the same surface 111 of the plate 110 in a similar arrangement to the former electrodes 120 such that each of the electrodes 120 and 130 are arranged alternately in a lateral row or like a grill. The electrodes 120 and the electrodes 130 are respectively connected to the two opposite terminals of a D.C. voltage source 140 which is of a variable voltage type. These electrodes 120 and 130 are made from a thin film of a conductive and transparent material such as tin oxide or indium oxide, and each gap between the two electrodes 120 and 130 is usually about 10 to about 500 $\mu$m in width. A frame 150 of a solid material, e.g., a synthetic resin, is placed on the upper surface 111 of the plate 110 to surround the entire electrodes 120 and 130. Within this frame 150, a thin layer 160 of a liquid material which is pervious to visible light is formed on and in intimate contact with the upper surface 111 of the plate 110. The liquid layer 160 has a uniform thickness of usually from about 10 to about 200 $\mu$m and is kept parallel to the plate 110.

As is well known, an electric double layer is created in the boundary regions of the solid material plate 110 and the liquid layer 160. Either the bottom region of the liquid layer 160 or the surface region of the solid material plate 110 is charged positively depending on the relationship between the values of the dielectric constants of the liquid and solid materials and presence of any ion dissociated from these materials, but the polarity in the double layer is determined unequivocally with respect to a definite combination of a particular solid material and a particular liquid material. When both of the sollid and liquid materials are dielectric materials containing no electrolyte component, either of these materials having a larger dielectric constant is usually charged positively and the other negatively. The material of the liquid layer 160 will be described later in detail.

Figure 2:
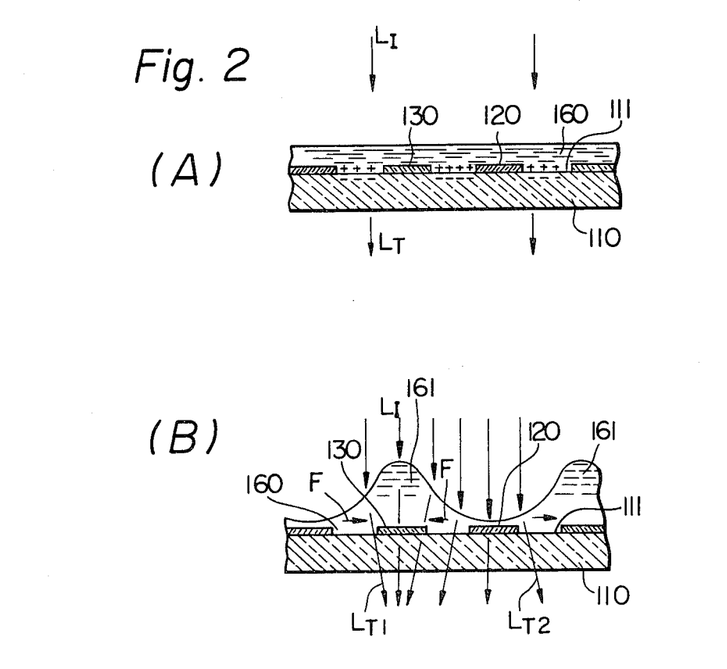
FIG. 2 shows schematically a part of the same element for the explanation of the principle of the function of the element.

Referring to FIG. 2, the liquid layer 160 is assumed to be charged positively, and no voltage is impressed on the electrodes 120 and 130 at the view (A). Since the substrate plate 110 is kept horizontal, the thickness of the liquid layer 160 is kept uniform owing to the surface tension thereof. When light rays indicated at $L_I$ is impinged on the control element 100 from the direction of the liquid layer 160, the rays $L_I$ pass through the modulation element 100 without being refracted or diffracted as indicated at $L_T$. When a D.C. voltage is applied to the electrodes 120 and 130 such that the electrodes 120 become positive electrodes and the electrodes 130 negative, the electrodes 120 exert a repulsive force on the positively charged liquid 160 but the negative electrodes 130 exert an attracting force on the same liquid 160. Since the substrate plate 110 is kept stationary and the electric field created in the liquid layer 160 has a potential gradient or electric vector in a direction parallel to the interface 111, a portion of the liquid 160 forming an upper region of the liquid layer 160 makes an electroosmotic movement towards the negative electrodes 130 as indicated by arrows F at the view (B). As a result, a ridge-like elevation or heap 161 of the liquid 160 is formed on each negative electrode 130, and the thickness of the liquid layer 160 is reduced in the vicinity of each positive electrode 120 by a magnitude proportional to the height of the heap 161. The ultimate height of the heap 161 is determined by the balance between the gravity on the heap 161 and the combined effect of the surface tension and the electroosmotic force which depends on the magnitude of the voltage applied across the electrodes 120 and 130. The heap 161 around each negative electrode 120 and the thinned region around each positive electrode 120 serve respectively as a convex lens and as a concave lens to the incident light rays $L_I$, so that the rays are partly refracted by passing through the heaps 161 as indicated at $L_{T1}$ and partly scattered as indicated at $L_{T2}$ by passing through the thinned region of the liquid layer 160. Accordingly, the transmitted light rays $L_T$ exhibit locally differentiated intensities or produce a light pattern when used as an incident light on a separate optical system.

The use of the elongate electrodes 120 and 130 in a spaced and parallel arrangement is an example of various techniques to create a patterned electric field having an electric vector in a direction parallel to the surface 111 of the substrate plate 110. When the substrate plate 110 is a thin sheet, either of the positive and negative electrodes 120 and 130 may be attached onto the lower surface of the substrate plate 110 as will be described later. A patterned electric field can be created also by scanning the lower surface of the substrate 110 with an electron beam of a variable intensity to deposit either positive or negative charges on this surface on condition that the substrate plate 110 is kept in an evacuated chamber.

From a different point of view, the liquid layer 160 is a dielectric layer which has a larger dielectric constant than air. When the liquid layer 160 is in an uneven state as shown at (B) in FIG. 2, a space imaginarily defined above the surface 111 of the substrate 110 is occupied by the dielectric (liquid) material partly and non-uniformly (practically only in the heap regions 161). The distribution of the dielectric (liquid) material in such a space can be varied periodically and differently, if desired, as will be understood from the previous description. Accordingly, the element 100 is useful in the field of a waveguide for microwaves.

Figure 3:
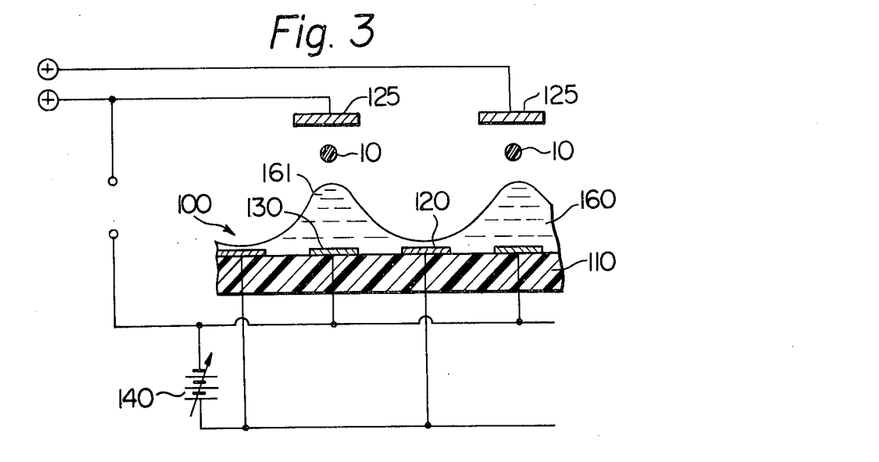
FIG. 3 is a sketch of a thickness inspection apparatus based on a control element according to the invention.

The changes in the thickness of the liquid layer 160 as a dielectric layer can be utilized in a different way. FIG. 3 is a sketch of a principal part of a thickness inspection apparatus which includes the control element 100. In this apparatus, a plurality of positive electrodes 125 are arranged at a fixed distance from the respective negative electrodes 130 of the element 100 such that the liquid layer 160 is interposed between the electrodes 130 and 125. The distance between the electrodes 130 and 125 is longer than the maximum height of the heap 161 of the liquid layer 160. An article indicated at 10 such as a string of a synthetic fiber yarn is passed through the gap between the positive and negative electrodes 125 and 130. Then, the variations in the thickness of the yarn 10 can be detected by measuring the changes in the capacitance across the gap. In conventional apparatus on this principle (which includes no liquid material 160), the width of the gap must be varied to regulate the value of the standard capacitance depending on the size of yarn 10 to be inspected. In the apparatus of FIG. 3, the standard capacitance between the electrodes 125 and 130 can easily be regulated without needing any movement of the electrodes 125 or 130 merely by varying the magnitude of the voltage impressed across the electrodes 120 and 130 of the control element 100 to vary the height of the heap 161 of the liquid material 160.

Figure 4:
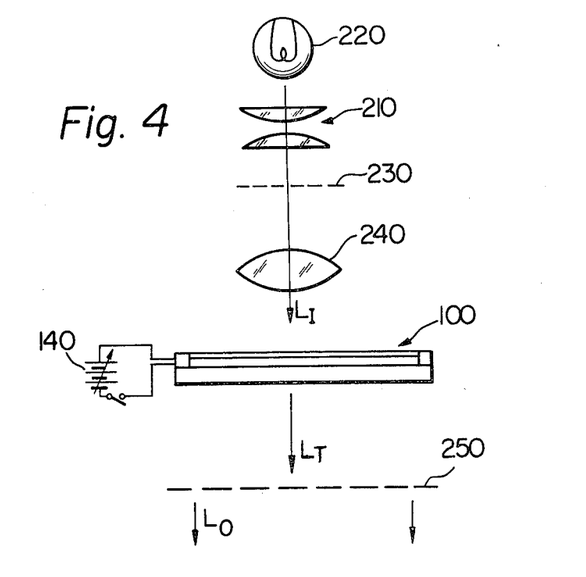
FIG. 4 is a schematic view of a general arrangement of a light modulating device based on the control element of FIG. 1.

A light modulating device according to the above quoted prior application is constructed, for example, as shown in FIG. 4. The device comprises a condenser lens 210 for gathering light rays from a source of light such as a tungsten or xenon lamp 220, an input grill 230 which consists of a plurality of light-impervious strips arranged to transmit the light rays gathered by the condenser lens 210 through its slits between the strips, a projector lens 240 arranged between the input grill 230 and the liquid layer 160 of the control element 100, and an output grill 250 which consists of a plurality of light-impervious strips arranged in a similar pattern to the input grill 230 to face the lower end face of the substrate plate 110. It will be understood that the device of FIG. 4 is a Schlieren system. The respective elements of this device are arranged such that the output grill 250 offers a maximum obstruction to the transmitted light rays $L_T$ from the control element 100 when the liquid layer 160 has a uniform thickness. Accordingly, the output light rays $L_O$ passed through the slits between the strips of the grill 250 give a light pattern including locally intensified regions when the liquid layer 160 is undulated due to the presence of the heaps 161.

Apart from the hereinbefore described dissatisfaction with the voltage sensitivity of control element 100, the construction of the device of FIG. 4 involves certain disadvantages inherent to the employment of a Schlieren system. The device is inevitably costly and needs to be adjusted very carefully in practical operations. Even when the device is once adjusted with satisfactory precision, the device is liable to lose its optical balance and stability of the function by the influences of a mechanical vibration even of a small amplitude and variations in the ambient conditions. Besides, the incident light $L_I$ is utilized only in a poor efficiency.

During our experiments on the liquid layer 160 of the control element 100, a simplified and more efficient construction was found to be useful in a light modulating device which includes the control element 100. A light modulating device of FIG. 5 consists of the control element 100 which is combined with the D.C. power source 140 and a sheet 170 of a semitransparent material, which is arranged opposite to and at a distance from the lower or exposed end face of the substrate plate 110.

Figure 5:
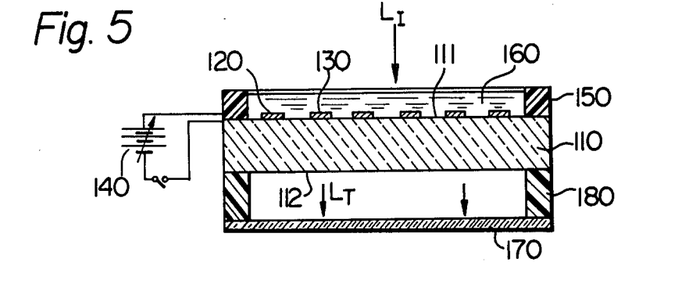
FIG. 5 is a schematic view of a general arrangement of a differently constructed light modulating device by the use of the same control element.

When the semitransparent sheet 170 is irradiated by visible light, the sheet 170 allows the light to pass therethrough but at the same time causes dispersion and scattering of the light. Examples of suitable semitransparent materials are a thin and frosted glass sheet, a sheet of tracing paper, a sheet of polytetrafluoroethylene and a sheet of a transparent synthetic resin containing a white pigment dispersed therein.

The semitransparent sheet 170 may be joined with the control element 100 with a spacer 180, but may alternatively be placed directly on the lower end face of the substrate plate 110 if the plate 110 has a relatively large thickness. With a relatively thick substrate plate 110, it is also possible to give a light-dispersing ability to the plate 110 instead of the provision of a separate semitransparent sheet 170 by subjecting the lower end face of the plate 110 to a frosting treatment with hydrofluoric acid or sand blasting. On the contrary, the semitransparent sheet 170 may be held independently of the control element 100 at either a fixed or a variable distance from the lower end face of the substrate plate 110. In any way, the semitransparent sheet 170 is positioned at a distance from the liquid layer 160 and on the opposite side of a surface of the liquid layer 160 on which the incident light $L_I$ impinges.

When no voltage is impressed on the electrodes 120 and 130 and the incident light rays $L_I$ pass through the control element 100 without being refracted or scattered, the semitransparent sheet 170 is irradiated by the transmitted light rays $L_T$ uniformly over its entire area so that no particular light pattern is produced on the sheet 170. When a voltage is applied across the electrodes 120 and 130 and the liquid layer 160 is undulated as described hereinabove with reference to FIG. 2, the refracted light rays $L_{T1}$ are focussed on the semitransparent sheet 170 at locations corresponding to the respective positions of the negative electrodes 130 if the sheet 170 is appropriately distant from the liquid layer 160. The remaining regions of the semitransparent sheet 170 is irradiated by the scattered light $L_{T2}$. Accordingly, a light pattern including bright regions corresponding to the negative electrodes 130 and very dark regions corresponding to the positive electrodes 120 is produced on the semitransparent sheet 170, and the patterned light passes through the sheet 170. The thus produced light pattern, therefore, can be observed through the semitransparent sheet 170 from the direction opposite of the control element 100.

Figure 6:
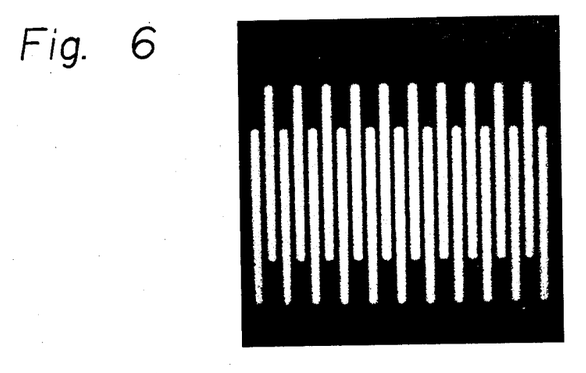
FIG. 6 is a photograph showing a pattern of electrodes arranged in the element of FIG. 1.
Figure 7:
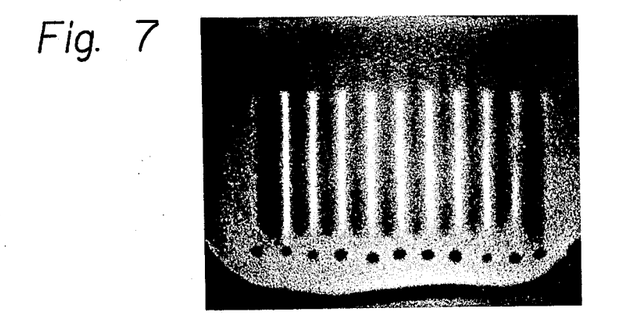
FIGS. 7 and 8 are photographs showing two examples of light patterns produced by the light modulating device of FIG. 5 using the electrodes pattern of FIG. 6.
Figure 8:
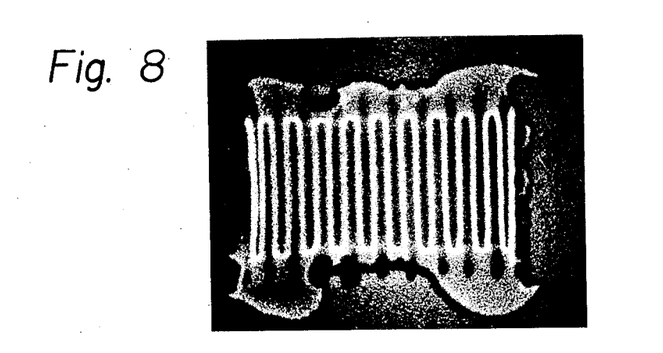

The photographs of FIGS. 7 and 8 are examples of light patterns produced on the semitransparent sheet 170 which has a sheet of transparent glass having a frosted surface. The substrate plate 110 was of a quartz glass, and 500 μm thick tin oxide electrodes 120 and 130 were arranged as seen in the photograph of FIG. 6 which was obtained by the use of a patterned mask for the deposition of the electrodes 120 and 130. The width of each gas between the individual electrodes 120 and 130 was 500 μm, and the liquid layer 160 which was about 50 μm thick and about 10 mm distant from the semitransparent sheet 170 was irradiated by parallel rays produced by the use of a tungsten lamp and a condenser lens. The photographs were taken from the opposite side of the semitransparent sheet 170 with respect to the liquid layer 160. The photograph of FIG. 7 shows a light pattern produced by application of a D.C. voltage across the electrodes 120 and 130 when the liquid material 160 was one having a relatively high viscosity, and FIG. 8 shows a light pattern obtained at the same voltage but with a different liquid material 160 having a lower viscosity. In these photographs, the black dots in a lower region represent the positions of the negative electrodes 130. In the light pattern of FIG. 8, two bright parallel lines are formed with each negative electrode 130. This results from an edge effect realized by the use of a liquid material 160 of a relatively low viscosity: the heaps 161 of the liquid material 160 are formed along the two longitudinal edges of each negative electrode 130.

Important factors to be considered in selecting a liquid material for forming the liquid layer 160 are transparency, viscosity, vapor pressure, boiling point, compatibility with and wetting ability to the material of the substrate plate 110. In addition, the liquid material is required to form an electric double layer when coated on the substrate plate 110. Taking carefully into consideration these factors, we have found that a most efficient liquid layer 160, i.e., the control element 100, can be formed by the use of a liquid organic silicon compound which has a functional group A capable of combining with, or having a chemical affinity with an organic material useful as the substrate plate 110 and/or another functional group B having a chemical affinity with an inorganic material useful as the substrate plate 110.

Silane and siloxane including organopolysiloxane are useful as the fundamental silicon compound to give a liquid compound employed in the present invention.

The functional group represented by the symbol A is selected from vinyl group, glycidoxy group, methacryloxy group, cycloepoxy group, mercapto group, and chlorine.

The functional group represented by the symbol B is an alkoxyl group, which is typified by methoxy, ethoxy and methoxyethoxy groups but may have more than 3 carbon atoms. Silanol group is another example of the functional group B.

As described hereinbefore, preferred inorganic materials for forming the substrate plate 110 are quartz and silica ($SiO_2$)-containing glass compositions such as soda lime glass and borosilicate glass. (All are non-conductive and pervious to visible light.) When a liquid silicon compound having an alkoxyl group (as the functional group H) is applied on the surface of the substrate plate 110 of such an inorganic material, the liquid compound chemically combines with the inorganic material either by condensation or hydrolysis of the alkoxyl group with silanol and/or aluminol contained in the inorganic material and/or water adsorbed on the surface of the inorganic material.

As will be understood from the role of the substrate plate 110 in the control element 100, an organic material typified by a synthetic resin also is useful as the material of the plate 110. The resin is preferably rigid and should be pervious to visible light when the element 100 is for use in an optical system. Examples of practicable resins are cellulose acetate, a mixed cellulose ester typified by cellulose acetate butylate, polystyrene, polyethylene, polypropylene, nylon, polytetrafluoroethylene, polyester, acrylic ester, epoxy and melamine resins. Even when the substrate plate 110 is made of one of these resins, the liquid silicon compound having the functional group B can frequently combine with the plate 110 presumably due to hydrolysis of the functional group B with water adsorbed on the surface 111 of the plate 110 or condensation of such water with silanol produced by hydrolysis of the silicon compound.

In the case of the substrate plate 110 being of a synthetic resin, however, the liquid layer 160 is preferably formed of a liquid silicon compound having the functional group A, which is selected from the above described various radicals according to the type of the resin. For example, vinyl group easily combines with a cellulose ester resin and a resin including double bonds such as polyester, acrylic ester, polypropylene and polystyrene resins, while cycloepoxy group is very highly reactive with epoxy, polyester and melamine results. Methacryloxy group is particularly suitable for cellulose ester, nylon and polytetrafluoroethylene resins.

Names of preferred compounds will be given hereinafter in the examples, wherein the control element 100 was constructed as shown in FIG. 1 and the function of the control element 100 was examined by the use of an optical system as shown in FIG. 4. The liquid layer 160 was formed from about 20 to about 50 μm thick.

EXAMPLE 1

The substrate 110 was of soda lime glass, and the transparent electrodes 120 and 130 were of tin oxide. The electrodes 120 and 130 consisted of a plurality of 500 μm wide strips arranged parallel to one another at a lateral distance of 500 μm.

Ethyl silicate $Si(OC_2H_5)_4$, which is a silane having ethoxy group $-OC_2H_5$ (alkoxyl group) as the functional group B, and has a viscosity of a few centistokes at room temperature, was used to form the liquid layer 160. In the electric double layer created in the control element 100, this liquid compound was charged positively.

With the thus constructed control element 100, an electric field was produced in the liquid layer 160 by impressing a D.C. voltage across the electrodes 120 and 130 from the power source 140, and the variation in the intensity of the output light $L_o$ passed through the slits of the output grill 250 was measured by means of a photomultiplier tube with variations in the field strength. The light intensity was expressed as the ratio of the intensity at each field strength to the intensity measured by the application of no voltage to the electrodes 120 and 130. The field strength was expressed as the quotient of the applied voltage by the width of each gap between the positive and negative electrodes 120 and 130, i.e., V/μm. The control element 100 exhibited an appreciable modulating action when the field strength was on a considerably low level, i.e., in the range from $10^{-2}$ to $10^{-1}$ V/μm. When a field strength at which the above defined light intensity ratio becomes 2 is represented by $E_t$ (V/μm), the value of $E_t$ was $3.6 \times 10^{-2}$ V/μm. The light intensity ratio K increased in proportion to about 1.6th power of the field strength E, and the ratio K reached a maximum value of about 30 when E was about $10^{-1}$ V/μm. This means that a contrast ratio of 1:30 can easily be obtained by the use of this control element 100. When E was brought to zero, the undulation of the liquid layer 160 disappeared instantaneously and the liquid layer 160 reverted into the initial state of a uniform thickness, so that the intensity of the output light $L_o$ decreased sharply to an initial low or dark level.

When the liquid layer 160 of this control element 100 was formed by the use of dimethyl silicone oil which had a viscosity of about 10 centistokes at room temperature, the control element 100 worked at E values ranging from about $10^{-1}$ to $10^0$ V/μm, and the value of $E_t$ was $1.5 \times 10^{-1}$ V/μm. It was difficult to raise the ratio K above 10.

It was confirmed that ethyl silicate exhibits a similarly good electroosmotic movability also when the substrate plate 110 was made of either borosilicate glass or quartz.

EXAMPLE 2

Methylphenylmethoxypolysiloxane $$CH_3-\underset{\underset{OCH_3}{|}}{\overset{\overset{\phi}{|}}{Si}}-O-\underset{\underset{OCH_3}{|}}{\overset{\overset{\phi}{|}}{Si}}-O-\underset{\underset{OCH_3}{|}}{\overset{\overset{\phi}{|}}{Si}}-CH_3$$

(where the symbol φ represent a phenyl group $C_6H_5-$), which has methoxy group $-OCH_3$ as the functional group B, was used as the liquid material 160 in the control element 100 of Example 1. This liquid material is an almost odorless and transparent liquid and has a viscosity of about 10 centistokes at room temperature and a low vapor pressure. When applied onto the surface of the soda lime glass plate 110, this liquid was charged positively along the interface 111. The value of $E_t$ with this liquid material was $6 \times 10^{-2}$ V/μm. This liquid material features excellent electrical, chemical and thermal stabilities and little evaporation during a prolonged exposure to the atmosphere.

EXAMPLE 3

The control element 100 of Example 1 was produced by the use of vinyl-tris-(β-methoxyethoxy)-silane $CH_2=CHSi(OCH_2CH_2OCH_3)_3$ as the liquid material 160. As seen, this compound has both the functional group B, i.e., methoxyethoxy group $-OCH_2CH_2OCH_3$, and the functional group A, i.e., vinyl group $CH_2=CH-$. This compound is a transparent and almost colorless and odorless liquid and is charged positively when applied onto the soda lime glass plate 110. The value of $E_t$ was $5.4 \times 10^{-2}$ V/μm.

EXAMPLE 4

Example 3 was repeated except that the substrate plate 110 was made of cellulose acetate. Also in this case, the positive side of the double layer in the control element 100 was formed in the liquid layer 160. The value of $E_t$ was $6 \times 10^{-4}$ V/μm which was only about 1/1000 of the value with a dimethyl silicone oil.

EXAMPLE 5

The methoxyethoxy groups of the compound used in Examples 3 and 4 were replaced by ethoxy group $-OC_2H_5$ to give vinyl-triethoxysilane $CH_2=CHSi(OC_2H_5)_3$. When examined in accordance with Example 1, the value of $E_t$ was $9 \times 10^{-3}$ V/μm. The liquid material of Example 3 has the tendency of dissolving a mixed cellulose ester resin typified by cellulose acetate butylate, but the liquid material of this Example has no such tendency. When the substrate plate 110 was of cellulose acetate butylate, the value of $E_t$ was $6 \times 10^{-4}$ V/μm.

EXAMPLE 6

Example 4 was repeated except that the liquid material 160 was diphenyl-divinylsilane $(C_6H_5)_2Si(CH=CH_2)_2$, which has vinyl group as the functional group A. The value of $E_t$ was $1.8 \times 10^{-2}$ V/μm.

EXAMPLE 7

The liquid layer of 160 of the modulation element 100 of Example 1 was formed by the use of β-(3,4-epoxycyclohexyl)-ethyl-trimethoxysilane —$CH_2CH_2Si(OCH_3)_3$, which has methoxy group as the functional group B and cycloepoxy group as the functional group A. The value of $E_t$ was $6 \times 10^{-2}$ V/μm, when the substrate plate 110 was of soda lime glass. When the plate 110 was of cellulose acetate, the value of $E_t$ was $1.8 \times 10^{-3}$ V/$\mu$m.

In the following four examples, a series of propylsilane derivatives which have both of the functional groups A and B and are expressed by a general formula $A(CH_2)_3SiB_3$ were used to form the liquid layer 160. The electrodes 120 and 130 were the same as in the preceding examples, and the thickness of the liquid layer 160 was in the range from about 20 to about 50 $\mu$m.

EXAMPLE 8

The liquid material was $\gamma$-methacryloxy propyltrimethoxysilane in which the functional group A is methoacryloxy group and the functional group B is methoxy group. This compound is transparent and has a viscosity of about 3 centistokes at room temperature.

Figure 9:
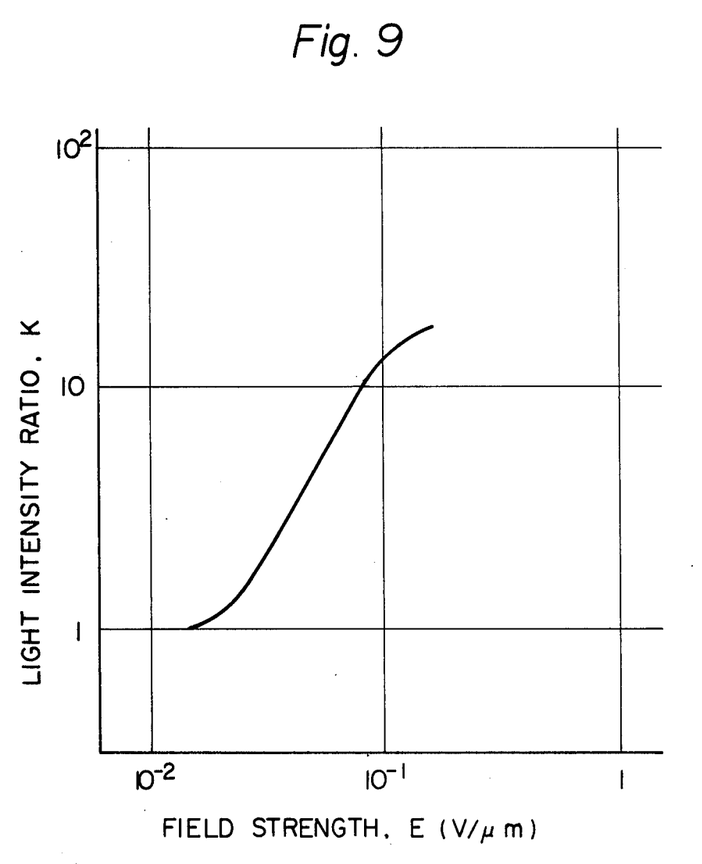
FIG. 9 is a graph showing an example of the variation in the intensity ratio of a modulated light to an unmodulated light with respect to the variation in the field strength of an electric field created in the element of FIG. 1.

The graph of FIG. 9 shows the relationship between the field strength E and the light intensity ratio K observed in this example. With the substrate plate 110 of soda lime glass, the value of $E_t$ at which the ratio K becomes 2 was $3 \times 10^{-2}$ V/$\mu$m as seen from the graph, and the control element 100 was operable when the field strength E was in the range between $10^{-2}$ to $10^{-1}$ V/$\mu$m. The ratio K increased sharply with increase in the value of E until almost saturated at about 30 when E was about $10^{-1}$ V/$\mu$m. In this state, it was possible to utilize about 40 percent of the light rays $L_T$ transmitted through the control element 100 as the output light $L_O$.

The liquid material in this example was useful for forming a practicable liquid layer 160 not only when the substrate plate 110 was of a different inorganic material such as borosilicate glass or quartz but also when the substrate 110 was of an organic material such as cellulose acetate, nylon or tetrafluoropolyethylene. With respect to a cellulose acetate substrate 110, the value of $E_t$ was as small as $3 \times 10^{-4}$ V/$\mu$m.

EXAMPLE 9

This example was similar to Example 8 except that the liquid material was $\gamma$-glycidoxypropyltrimethoxysilane in which the functional group A is glycidoxy group and the functional group B is methoxy group. The value of $E_t$ was $9 \times 10^{-2}$ V/$\mu$m with the soda lime glass substrate 110. It was confirmed that this liquid material was practicable also when the substrate 110 was of cellulose acetate, nylon or polytetrafluoroethylene.

EXAMPLE 10

Also this example was similar to Example 8 except that the liquid material was mercaptopropyl-trimethoxysilane $SH(CH_2)_3Si(OCH_3)_3$ in which the mercapto group SH— was the functional group A. The value of $E_t$ was $3 \times 10^{-2}$ V/$\mu$m with the soda lime glass substrate 110 and $1.8 \times 10^{-3}$ V/$\mu$m with the cellulose acetate substrate 110.

Other than nylon and polytetrafluoroethylene, a mixed ester of cellulose was useful as an organic material of the substrate plate 110 in combination with the liquid layer 160 of this liquid compound. When the substrate 110 was of cellulose acetate butylate, the value of $E_t$ was $3 \times 10^{-4}$ V/$\mu$m.

EXAMPLE 11

Example 8 was repeated except that the liquid material was 3-chloropropyl-trimethoxysilane $Cl(CH_2)_3Si(OCH_3)_3$ in which the functional group A was chlorine radical. This compound was useful in combination with any of the soda lime glass, cellulose acetate and cellulose acetate butylate substrates 110, and the values of $E_t$ with these substrates 110 were $1.8 \times 10^{-2}$, $1.8 \times 10^{-3}$ and $6 \times 10^{-4}$ V/$\mu$m, respectively. This compound was applicable also to a nylon or polytetrafluoroethylene substrate 110.

In the propyl-trialkoxysilanes $A(CH_2)_3SiB_3$, the functional group B is not necessarily limited to methoxy group as in these Examples but may be ethoxy or methoxyethoxy group. Besides, silanol group serves as an alternative of alkoxyl group.

The remarkably high sensitivities of the liquid layer 160 according to the invention to the field strength of the electric field created therein as illustrated in these examples originate from the following state of the liquid layer 160. When the liquid material 160 has an appropriately selected functional group A and/or functional group B, a bond between the liquid material 160 and the solid material 110 can be realized in an extremely thin layer of the order of angstrom and may be almost equal in thickness to a single molecule of the liquid compound. Such a favorable bond can be realized even when the substrate 110 is of an inorganic material which does not contain silica, as typified by metals (including alloys), if the liquid silicon compound has an alkoxy group as the functional group B because of the hydrolysis as described hereinbefore. As a result, the surface 111 of the solid material 110 is wetted very well with the liquid material 160, and a stable and strong electric double layer can be formed in the boundary regions. Besides, the molecules of the liquid compound in the boundary region are electrically oriented such that the functional group A or B of each molecule points to the surface 111. The easiness of forming an electric double layer and the small thickness of the double layer (comparable to a monomolecular layer) are quite favorable to the occurrence of an electroosmotic phenomenon. The small thickness of the electric double layer means that only an extremely small portion of the liquid material 160 is restricted in its movement by the solid material 160, so that a comparatively large portion of the liquid material 160 can participate in an electroosmotic movement towards the electrodes 120 and 130 of a specific polarity even when the electric fields around the electrodes 120 and 130 are of a comparatively weak field strength.

In Examples 1 to 11, the liquid layer 160 was formed by the use of a single compound containing no additive. A liquid material according to the invention includes either a solution of the above defined silicon compound in an organic solvent or a mixture of the same compound and a liquid organic compound which has neither the functional group A nor B. The use of a solution or a mixture is convenient to obtain an optional viscosity of the liquid material. Vinyl triethoxysilane in Example 5, for example, can be diluted easily by the use of an alcohol, a ketone or an ester, and β-(3,4-epoxycyclohexyl)-ethyl-trimethoxysilane in Example 7 can be diluted by almost every organic solvent. For γ-glycidoxypropyl-trimethoxysilane in Example 9, alcohols, ketones and esters are useful solvents. For mercaptopropyl-trimethoxysilane in Example 10 and 3-chloropropyl-trimethoxysilane in Example 11, useful solvents are acetone, benzene, heptane, ethyl ether and perchloroethylene. The solvent should not significantly be volatibe and, when the element 100 is for an optical system, should be pervious to visible light.

Also it is possible to use a mixture of two or more liquid silicon compounds as defined hereinbefore as the material of the liquid layer 160 irrespective of the addition of a different liquid material such as a solvent.

When the control element 100 is for use in an optical system and the substrate 110 is of a light pervious material, it is favorable that the liquid material 160 has the same refractive index as the solid material of the substrate 110 for avoiding unnecessary bendings of light rays on the interface 111. Since, in most cases, the refractive index of the liquid silicon compound having the functional group A and/or B is not equal to the refractive index of any of the above described transparent solid materials, the use of a mixture of two or more liquid silicon compounds as the liquid material 160 for the control element 100 has another merit of affording a desired refractive index. The following example illustrates the adjustment of the refractive index by mixing two kinds of liquid compounds.

EXAMPLE 12

The cellulose acetate substrate 110 in the previous Examples had a refractive index $n_D$ of 1.47. The liquid material of Example 8, γ-methacryloxy propyltrimethoxysilane, is applicable to the cellulose acetate substrate 110 as described previously, but has not the same refractive index as cellulose acetate. The value of $n_D$ for this liquid is 1.43. When phenylmethylpolysiloxane of which value of $n_D$ is 1.58 was mixed with γ-methacryloxy propyltrimethoxysilane in an amount of 40% by volume of the latter, the $n_D$ value of the resulting mixture was just 1.47.

The cellulose acetate butylate substrate 110 in the previous Examples had a refractive index $n_D$ of 1.51. The following phenylalkoxysilanes were found to be suitable for use in combination with this substrate other than the liquid silicon compounds in the previous Examples, but the values of $n_D$ for all of them were different from 1.51 as shown below.

| Compounds | $n_D$ | Viscosity(cs) | $E_t(V/\mu m)$ |
|---|---|---|---|
| (a) $(C_6H_5)_2Si(OC_2H_5)_2$ | 1.52 | 7.2 | $1.3 \times 10^{-2}$ |
| (b) $(C_6H_5)_2Si(OCH_3)_2$ | 1.54 | 11 | $1.5 \times 10^{-2}$ |
| (c) $C_6H_5Si(OC_2H_5)_3$ | 1.46 | 1.2 | $4.2 \times 10^{-3}$ |
| (d) $C_6H_5Si(OCH_3)_3$ | 1.47 | 2.2 | $7.2 \times 10^{-3}$ |

(The values of $E_t$ were obtained in accordance with Example 1 with the cellulose acetate butylate substrate.)

The desired value of $n_D$, 1.51, was realized by mixing appropriately selected two compounds among these compounds (a)–(d), and the mixtures also exhibited excellent electroosmotic movability as represented by the following data for typical four mixtures.

| Mixtures (volume ratio) | $n_D$ | Viscosity (cs) | $E_t (V/\mu m)$ |
|---|---|---|---|
| (a) : (c) = 1:0.26 | 1.51 | 4.6 | $5.0 \times 10^{-3}$ |
| (a) : (d) = 1:0.37 | 1.51 | 4.2 | $6.6 \times 10^{-3}$ |
| (b) : (c) = 1:0.65 | 1.51 | 3.8 | $3.2 \times 10^{-3}$ |
| (b) : (d) = 1:0.97 | 1.51 | 4.2 | $7.2 \times 10^{-3}$ |

For soda lime glass of which $n_D$ is 1.57, the liquid compound of Example 2, methylphenylmethoxypolysiloxane, has the same $n_D$ value. Also various mixtures are useful for this glass.

As mentioned hereinbefore, a liquid silicon compound having no functional group A but only the functional group B is sometimes applicable to the substrate plate 110 of an organic material owing to a favorable action of moisture. When the organic solid material is a cellulose ester typified by cellulose acetate, it is very effective in realizing a strong bond between the solid material and the functional group B either to add a trace amount of water to the liquid material or to make the solid material absorb a little moisture. When the glass substrate 110 in Example 1 was replaced by the cellulose acetate butylate plate in Example 5, the value of $E_t$ with the liquid layer 160 of ethyl silicate was $3 \times 10^{-3}$ V/μm. In the case of phenyl methoxysiloxane in Example 2, the value of $E_t$ varied to $6 \times 10^{-3}$ V/μm with the cellulose acetate substrate 110 and $1.8 \times 10^{-2}$ V/μm with the cellulose acetate butylate substrate. The reason for these good results despite exclusion of the functional group A is presumed hereinbefore. Apart from the participation of water in chemical bonding, creation of an ideal electric double layer owing to the aforementioned orientation of the compound having an alkoxyl group may be an origin of these small values of $E_t$ for cellulose esters.

In certain cases, chlorine radical which is one of the functional groups A according to the invention serves also as an alternative to an alkoxyl group, i.e., the functional group B, since a chlorinated silicon compound gives silanol by hydrolysis and chemically combines with an inorganic material typified by glass which contains silica $SiO_2$.

Various derivatives of silane or siloxane other than the compounds used in Examples 1 to 12 are useful for forming the liquid layer 160.

When a general formula $SiQ_4$ is used to represent a silane, a liquid monosilane in which at least one of four Qs is the functional group A and/or the functional group B while the remaining Qs are hydrogen, alkyl or phenyl radicals is useful for forming the liquid layer 160. Examples of silanes having only the functional group A are diphenyl divinylsilane and tetravinylsilane, and silanes having only the functional group B are exemplified by dimethyl dimethoxysilane, methyl triethoxysilane, diphenyl diethoxysilane, diphenyl dimethoxysilane, phenyl triethoxysilane, phenyl trimethoxysilane, diphenyl dichlorosilane, methylphenyl dimethoxysilane, methylphenyl trimethoxysilane, tetraaroxysilane (which has arroxy group $—OCH_2CH=CH_2$ as alkoxyl groups), tetraamyl silicate, tetrapentyl silicate, tetraheptyl silicate, tetraoctyl silicate, and tetradecyl silicate. Vinylmethyl dimethoxysilane is an example of silanes having both the functional groups A and B.

The silane is Example 7 is represented by the formula $A(CH_2)_nSiB_3$. As seen from this general formula, it is preferable with respect to silanes having both the functional groups A and B that the functional group A is not directly attached to the silicon atom and that at least one methylene radical —$CH_2$— is interposed between the silicon atom and the functional group A.

Another group of silanes which have the functional group B and at least one alkyl (preferably methyl or ethyl) or phenyl group also are very suitable as the liquid material 160 according to the invention.

The siloxane in Example 2 is represented by the formula $Si(OSi)_nQ_{3(n+1)}$, where $n=2$. In this formula, $n$ may be changed to 1, 3 or more on condition that at least one of $3(n+1)$Qs is the functional group A and/or the functional group B while the remaining Qs are different organic radicals typified by hydrogen, alkyl and phenyl. Tetramethyl divinylsiloxane is an example of useful liquid siloxanes having the functional group A wherein $n$ is 1. When $n$ is 2, one or two of the three functional groups B (methoxy groups) in Example 2 may be replaced by non-functional groups such as alkyl, while at least one of the three phenyl groups may be replaced by the functional group A. Particularly for siloxanes having the functional group B alone, it is preferable that the siloxanes have at least one alkyl (usually methyl or ethyl) or, more preferably, phenyl group.

The following Example illustrates excellent properties of the above described liquid materials.

EXAMPLE 13

The same procedures as in the previous Examples were employed, and the field strength $E_t$ were examined with the soda lime glass substrate 110 and the mixed cellulose ester substrate.

| Liquid materials | $E_t$ V/$\mu$m glass substrate | cellulose ester substrate |
|---|---|---|
| tetravinylsilane $(CH_2=CH)_4Si$ | $2.8 \times 10^{-2}$ | $6.0 \times 10^{-2}$ |
| diphenyl divinylsilane $(C_6H_5)_2Si(CH_2=CH)_2$ | $5.3 \times 10^{-2}$ | $4.0 \times 10^{-2}$ |
| phenyl trimethoxysilane $(C_6H_5Si(OCH_3)_3$ | $9.3 \times 10^{-2}$ | $2.5 \times 10^{-2}$ |
| phenyl triethoxysilane $C_6H_5Si(OC_2H_5)_3$ | $9.6 \times 10^{-2}$ | $4.2 \times 10^{-3}$ |
| methyl triethoxysilane $CH_3Si(OC_2H_5)_3$ | $3.5 \times 10^{-2}$ | $1.9 \times 10^{-3}$ |
| diphenyl dimethoxysilane $(C_6H_5)_2Si(OCH_3)_2$ | $2.7 \times 10^{-2}$ | $1.5 \times 10^{-2}$ |
| diphenyl diethoxysilane $(C_6H_5)_2Si(OC_2H_5)_2$ | $6.0 \times 10^{-2}$ | $1.3 \times 10^{-2}$ |
| methylphenyl trimethoxysilane $(CH_3)(C_6H_5)Si(OCH_3)_3$ | $1.5 \times 10^{-1}$ | $3.0 \times 10^{-2}$ |
| tetrapentyl silicate $Si(OC_5H_{11})_4$ | $6.6 \times 10^{-2}$ | $4.1 \times 10^{-2}$ |
| tetraheptyl silicate $Si(OC_7H_{15})_4$ | $1.1 \times 10^{-1}$ | — |
| tetraoctyl silicate $Si(OC_8H_{17})_4$ | $6.0 \times 10^{-2}$ | $4.6 \times 10^{-2}$ |
| tetramethyl divinylsiloxane $(CH_2=CH)_2((CH_3)_2Si)_2O$ | $1.0 \times 10^{-1}$ | $4.0 \times 10^{-2}$ |

In addition to the above described monomers, some polymers of silicon compounds also are useful for forming the liquid layer 160 according to the invention. Typical liquid polymers of silicon compounds are organopolysiloxanes which are generally called silicone oil. As is known, an organopolysiloxane is composed of monosiloxane (will hereinafter be represented by the symbol M), bifunctional siloxane (represented by D) and trifunctional siloxane (represented by T). In silicone oils, the principal chain usually consists of D units with terminal M units as represented by $M(D)_nM$. There are present, however silicone oils which have a chain structure including T unit in the middle as represented by The non-functional groups Q are usually hydrogen, methyl or phenyl radicals. Silicone oils are commonly called hydrogen silicone oil, methyl silicone oil and phenyl silicone oil according to the kinds of the radicals Q. As the fundamental structure of the liquid material in the present invention, polysiloxanes which have phenyl groups and methyl groups are preferred. A useful liquid material for forming the liquid layer 160 is obtained by substitution of these Q radicals at least in one position by the functional group A such as a vinyl group or a cycloepoxy group and/or the functional group B typified by an alkoxyl group.

The viscosity of a silicone oil increases with increase in the degree of polymerization, $n$. The value of $n$ is preferably $10^2$ at the largest because it is desired that the viscosity of a liquid material for forming the liquid layer 160 is $10^3$ centistokes at the highest.

Both in the case of a silicon compound monomer and in the case of a polysiloxane, a relatively simple compound which has only at least one alkoxyl group among the functional groups A and B is practically convenient to form the liquid layer 160 because of its ability of combining not only with inorganic solid materials for the substrate plate 110 but also with some organic solid materials as described hereinbefore.

Figure 10:
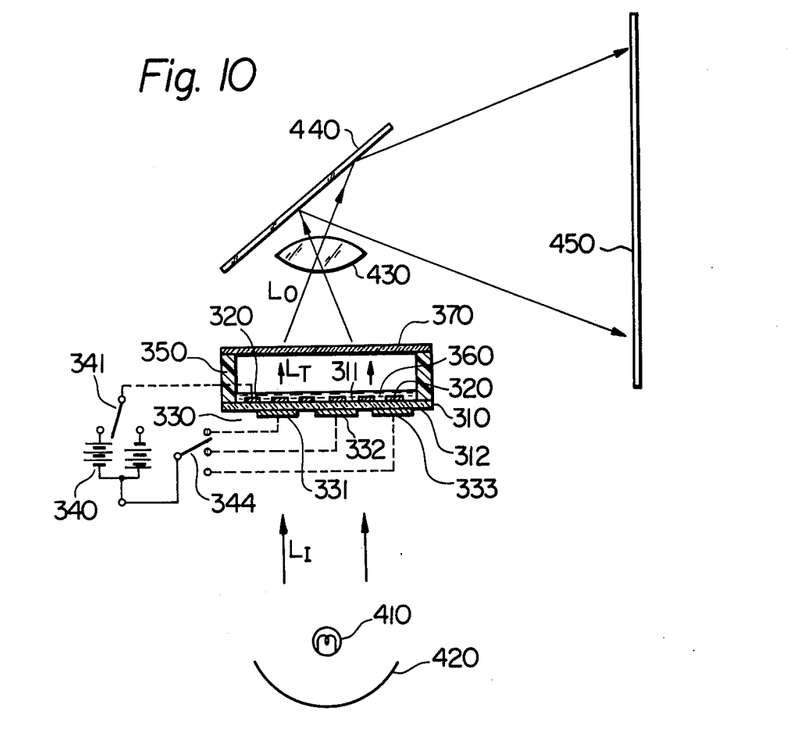
FIG. 10 is a schematic view of a general arrangement of a still differently constructed light modulating device, wherein a slightly modified control element is used.

FIG. 10 shows another example of a light modulation device according to the invention in which a control element has electrodes 320 and 330 arranged differently from the electrodes 120 and 130 in FIG. 1. A transparent substrate plate 310 is of either an inorganic material such as quartz or a silica-containing glass or an organic synthetic resin such as a cellulose ester resin and has a thickness of from about 10 to 300 $\mu$m. A plurality of electrodes 320 of the same polarity are made of a thin film of a transparent conductor such as tin oxide or copper iodide and attached onto the upper surface 311 of the substrate 310 in a spaced arrangement. The electrodes 320 may be a plurality of strips in a parallel arrangement, but may alternatively take the form of a single sheet having a multiplicity of apertures arranged to make the sheet a network. In the latter case, the number of apertures per inch length of the sheet both lengthwise and sideways may be from about 50 to about 1000. A frame member 350 is placed on the surface 311 to surround the entire electrodes 320, and a liquid layer 360 is formed on the surface 311 to a thickness from about 10 to about 200 $\mu$m by the use of a liquid material in accordance with the present invention. A plurality of patterned electrodes 330, represented by three units 331, 332 and 333, are attached onto the opposite surface 312 of the substrate plate 310. The electrodes 330 also are made of a transparent material. A D.C. power source 340 of a variable voltage type is arranged such that the electrodes 320 on the upper surface 311 can be connected to either of the positive and negative terminals of the power source 340 by means of a turnover switch 341. Another switch 344 is provided to selectively connect one of the three electrode units 331, 332 and 333 to the opposite terminal of the power source 340 with respect to the electrodes 320. The frame member 350 serves also as a spacer to support a semitransparent sheet 370 parallel to and at an appropriate distance, e.g., about 5 to about 20 mm, from the liquid layer 360. The semitransparent sheet 370 corresponds to the similar sheet 170 of FIG. 5 and is of a transparent glass having a frosted surface, for example.

A light source 410 such as a xenon lamp is provided in combination with a reflex mirror 420 to irradiate the lower surface 312 of the substrate 310. The device includes a projector system which is made up of a lens 430 arranged at an appropriate distance from the semitransparent sheet 370, a reflex mirror 440 on which the rays through the lens 430 impinges and a screen 450 arranged spaced from and at an angle with the reflex mirror 440.

When the liquid material 360 is charged positively in the boundary region along the surface 311 of the substrate 310 and a D.C. voltage is impressed across the electrodes 320 and 331 such that the electrodes 320 are negative, an electric field or the flow of a current is principally in the direction vertical to the liquid layer 360. To cause an electroosmotic movement of the liquid material 360 in a direction parallel to the surface 311 of the substrate 310, the electric vector of the electric field is required to include a lateral component. The lower electrodes 330, therefore, are arranged such that each unit 331, 332 or 334 lies opposite to at least one of the gaps between the individual electrodes 320. Each unit 331, 332 or 333 is preferably shaped to be wide enough to face a plurality of gaps between the electrodes 320. Then a portion of the liquid material moves towards a portion of the negative electrodes 320 located above the positive electrode 331, so that the liquid layer 360 becomes uneven in a region opposite to the electrode unit 331. As a result, a portion of the light rays $L_l$ is refracted and scattered by travel through the liquid layer 360, and a light pattern corresponding to the pattern of the electrode unit 331 is produced on the semitransparent sheet 370. The bright and dark regions in the thus produced light pattern are reversed if the electrodes 320 and the electrode unit 331 are connected to the positive and negative electrodes of the power source 340, respectively. This light pattern is projected on the screen 450 on an enlarged scale. A different light pattern is projected on the screen 450 when the electrode unit 331 is switched to another unit 332 or 333. It will be understood that the device of FIG. 10 can project selectively various light patterns including figures and letters on the screen 450 as a magnification of an electrical pattern on the lower surface 312 of the substrate 310. The contrast and/or details of the projected light pattern can be varied by varying the magnitude of the voltage applied to the control element 300.

As a still different method of creating an electric field in the liquid layer 360, the substrate plate 310 may be struck by an electron beam. In this case, the substrate 310 is provided with no electrode (330) on its lower surface 312 and takes the form of a faceplate of a cathode-ray tube (not shown) arranged to make the lower surface 312 the inside of the faceplate.

A charge pattern which is either positive or negative is produced on the lower surface 312 of the substrate 310 when this surface 312 is scanned with a density-modulated electron beam. The electrodes 320 on the upper surface 311 of the substrate 310 are so connected with the cathode section of the electron gun of the cathode-ray tube as to allow the charge deposited on the lower surface 312 to leak into the cathode section through the substrate 310, liquid layer 360 and the electrodes 320. Then, electric field corresponding to the density distribution in the charge pattern produced on the lower surface 312 are created in the liquid layer 360, so that the liquid layer 360 is rendered uneven through the electroosmotic movement as described hereinbefore.

Consequently, a light pattern in compliance with the charge pattern is projected on the screen 450. The control element in this case functions as an essential element of a magnifying projector for a television image.

What is claimed is:

1. A control element including a liquid material which is attainable to a geometrically uneven state in response to an electrical signal, the element comprising:

a support member of a solid material;
   a liquid material supported by and in intimate contact with said support member; and
   means for creating in said liquid material a patterned electric field having an electric vector in a direction parallel to an interface between said support member and said liquid material, so that a portion of said liquid material makes an electroosmotic movement when said electric field is present in said liquid material;
   said liquid material comprising at least one silicon compound having at least one of a first functional group having chemical affinity with organic solid material useful as the material of said substrate plate and a second functional group having chemical affinity with inorganic solid materials useful as the material of said substrate plate.

2. A control element as claimed in claim 1, wherein said silicon compound is a derivative of a different silicon compound selected from the group consisting of silane and siloxane.

3. A control element as claimed in claim 2, wherein said first functional group is selected from the group consisting of vinyl group, methacryloxy group, glycidoxy group, cycloepoxy group, mercapto group and chlorine, said second functional group being an alkoxyl group.

4. A control element as claimed in claim 3, wherein said alkoxyl group is selected from the group consisting of methoxy group, ethoxy group, methoxyethoxy group, aroxy group, amyloxy group, heptyloxy group, octyloxy group and decyloxy group.

5. A control element as claimed in claim 4, wherein said silicon compound has only one of said first and second functional groups.

6. A control element as claimed in claim 5, wherein said silicon compound has said first functional group, said solid material being an organic material.

7. A control element as claimed in claim 6, wherein said silicon compound is selected from the group consisting of diphenyl divinylsilane and tetramethyl divinylsiloxane.

8. A control element as claimed in claim 6, wherein said organic material is a synthetic resin.

9. A control element as claimed in claim 5, wherein said silicon compound has said second functional group.

10. A control element as claimed in claim 9, wherein said silicon compound has at least one hydrocarbon radical selected from alkyl groups and phenyl group attached to silicon atom.

11. A control element as claimed in claim 10, wherein said silicon compound is selected from the group consisting of methyl triethoxysilane, dimethyl dimethoxysilane, phenyl trimethoxysilane, phenyl triethoxysilane, diphenyl dimethoxysilane, diphenyl diethoxysilane, methylphenyl dimethoxysilane and methylphenyl trimethoxysilane.

12. A control element as claimed in claim 9, wherein said silicon compound is selected from the group consisting of ethyl silicate, tetraamylsilicate, tetraheptyl silicate, tetraoctyl silicate, tetradecylsilicate and tetraaroxysilane.

13. A control element as claimed in claim 9, wherein said solid material is an inorganic material selected from the group consisting of a silica-containing glass and quartz.

14. A control element as claimed in claim 9, wherein said solid material is a cellulose ester resin.

15. A control element as claimed in claim 4, wherein said silicon compound has both of said first and second functional groups.

16. A control element as claimed in claim 15, wherein said silicon compound is selected from the group consisting of vinyl-tris-($\beta$-methoxyethoxy)-silane, vinyl triethoxysilane, $\beta$-(3,4-epoxycyclohexyl)-ethyl-trimethoxysilane and vinyl methyl dimethoxysilane.

17. A control element as claimed in claim 15, wherein said silicon compound is a trialkoxysilane represented by the formula $A(CH_2)_n SiB_3$, where A is said first functional group, B is said second functional group and $n$ is an integer from 1 to 3.

18. A control element as claimed in claim 17, wherein said trialkoxysilane is selected from the group consisting of $\gamma$-methacryloxypropyl trimethoxysilane, $\gamma$-glycidoxypropyl trimethoxysilane, mercaptopropyl trimethoxysilane and 3-chloropropyl trimethoxysilane.

19. A control element as claimed in claim 15, wherein said solid material is an inorganic material selected from the group consisting of a silica-containing glass and quartz.

20. A control element as claimed in claim 15, wherein said solid material is an organic synthetic resin.

21. A control element as claimed in claim 4, wherein said liquid material consists of a single kind of said silicon compound.

22. A control element as claimed in claim 4, wherein said liquid material consists of said silicon compound and another organic liquid compound.

23. A control element as claimed in claim 4, wherein said silicon compound is an organopolysiloxane having a viscosity of $10^3$ centistokes at the highest at room temperature.

24. A control element as claimed in claim 4, wherein said solid material and said liquid material have substantially the same refractive index, said solid material being pervious to visible light.

25. A control element as claimed in claim 24, wherein said liquid material is a mixture of at least two different kinds of said silicon compounds.

26. A control element as claimed in claim 24, wherein said liquid material is a mixture of said silicon compound and another organic liquid compound.

27. A control element as claimed in claim 4, wherein said support member is a flat plate, said solid material being pervious to visible light, said liquid material forming a layer of a uniform thickness on one side of said plate.

28. A control element as claimed in claim 27, wherein the other side of said plate is frosted.

29. A control element as claimed in claim 27, wherein said uniform thickness of said layer of said liquid material is from 20 to 50 $\mu$m.

30. A control element as claimed in claim 27, wherein said means comprise at least a pair of electrodes of a transparent and conductive material placed on said one side of said plate and spaced from one another.

31. A control element as claimed in claim 30, wherein said transparent and conductive material is selected from the group consisting of tin oxide, indium oxide and copper iodide.

32. A control element as claimed in claim 30, wherein said at least a pair of electrodes are more than two electrodes arranged such that a positive electrode and a negative electrode are placed alternately.

33. A control element as claimed in claim 12 wherein each of said electrodes is a strip of a thin film arranged laterally parallel.

34. A light modulating device comprising:
a horizontally arranged substrate plate of a solid material pervious to visible light;
a layer of a liquid material pervious to visible light formed to a uniform thickness on one surface of said substrate plate;
first means for creating in said layer a patterned electric field having an electric vector in a direction parallel to said surface, so that a portion of said liquid material makes an electroosmotic movement in a direction parallel to said surface to cause said layer to become uneven in thickness when said electric field is present in said layer; and
second means for detecting bendings of visible light rays irradiated on and passed through said layer and said substrate plate, said bendings being caused by travel of said rays through said layer when said electric field is present in said layer;
said liquid material comprising at least one silicon compound having at least one of a first functional group having chemical affinity with organic solid materials useful as the material of said substrate plate and a second functional group having chemical affinity with inorganic solid materials useful as the material of said substrate plate.

35. A device as claimed in claim 34, wherein said second means comprise a sheet of a semitransparent material arranged parallel to and spaced from one surface of said layer of said liquid material such that said visible light rays impinge on said sheet after said rays passed through said layer and produce a light pattern visible from the opposite side of said sheet when said rays are refracted and scattered due to unevenness of said layer.

36. A device as claimed in claim 35, wherein said semitransparent material is a frosted glass.

37. A device as claimed in claim 35, wherein said semitransparent material is an organic material selected from the group consisting of paper and synthetic resins.

38. A device as claimed in claim 35, wherein said sheet is arranged on the reverse side of said substrate plate to said layer.

39. A device as claimed in claim 35, wherein said sheet is arranged on the same side of said substrate plate as said layer.

40. A device as claimed in claim 39, wherein said first means comprise a plurality of first electrodes of a transparent material placed on said one surface of said substrate plate to form a plurality of gaps therebetween, a plurality of patterned second electrodes of a transparent material placed on the reverse surface of said substrate plate in such an arrangement that a portion of each of said second electrodes is opposite to at least one of said gaps between said first electrodes, and means for impressing a D.C. voltage across said first electrodes and a selectively variable portion of said second electrodes, the device being arranged such that said visible light rays irradiate said layer of said liquid material from the direction of said substrate plate.

41. A device as claimed in claim 35, wherein said first means comprise at least a pair of electrodes of a transparent and conductive material placed on said surface of said substrate plate and spaced from one another.

* * * * *